(12) United States Patent
Sladek et al.

(10) Patent No.: US 8,339,742 B1
(45) Date of Patent: Dec. 25, 2012

(54) SLIDER WITH LEADING EDGE BLEND AND CONFORMAL STEP FEATURES

(75) Inventors: Eric T. Sladek, Pleasanton, CA (US);
Mark D. Moravec, Gilroy, CA (US);
Hariharakeshava S. Hegde, Fremont, CA (US); Ittipon Cheowanish, Maung Nonthaburi (TH)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/310,931

(22) Filed: Dec. 5, 2011

Related U.S. Application Data

(62) Division of application No. 12/194,344, filed on Aug. 19, 2008, now Pat. No. 8,087,973.

(51) Int. Cl.
*G11B 5/60* (2006.01)
*G11B 21/21* (2006.01)

(52) U.S. Cl. .................... 360/236.4; 360/235.6

(58) Field of Classification Search ............... 360/235.6, 360/235.9, 236.4, 236.7
See application file for complete search history.

(56) References Cited

U.S. PATENT DOCUMENTS

| | | | |
|---|---|---|---|
| 4,327,387 A * | 4/1982 | Plotto | 360/235.2 |
| 5,062,017 A | 10/1991 | Strom et al. | |
| 5,136,445 A | 8/1992 | Zak | |
| 5,301,077 A * | 4/1994 | Yamaguchi et al. | 360/236.7 |
| 5,335,458 A | 8/1994 | Stoffers et al. | |
| 5,516,323 A | 5/1996 | Carlson et al. | |
| 5,607,340 A | 3/1997 | Lackey et al. | |
| 5,768,055 A | 6/1998 | Tian et al. | |
| 5,872,686 A | 2/1999 | Dorius et al. | |
| 5,939,133 A | 8/1999 | Ganapathi et al. | |
| 5,997,755 A | 12/1999 | Sawada | |
| 6,014,288 A | 1/2000 | Cha et al. | |
| 6,069,769 A | 5/2000 | Dorius et al. | |
| 6,093,083 A | 7/2000 | Lackey | |
| 6,162,114 A | 12/2000 | Kobayashi et al. | |
| 6,257,959 B1 | 7/2001 | Kobayashi et al. | |
| 6,361,399 B2 | 3/2002 | Kobayashi et al. | |
| 6,398,623 B1 | 6/2002 | Fukuroi et al. | |
| 6,483,668 B2 | 11/2002 | Hipwell et al. | |
| 6,504,681 B1 | 1/2003 | Sawada | |
| 6,531,084 B1 | 3/2003 | Strom et al. | |
| 6,542,334 B2 | 4/2003 | Polycarpou et al. | |
| 6,552,876 B1 | 4/2003 | Berg et al. | |
| 6,563,785 B2 * | 5/2003 | Schaenzer et al. | 369/300 |

(Continued)

FOREIGN PATENT DOCUMENTS

JP 63064620 A * 3/1988

(Continued)

OTHER PUBLICATIONS

Office action dated Mar. 8, 2011 from parent U.S. Appl. No. 12/194,344.

(Continued)

*Primary Examiner* — Will J Klimowicz

(57) ABSTRACT

A slider having an air bearing surface and a leading face is described. The slider comprises a leading edge blend comprising a first curved surface formed at an intersection of the air bearing surface and the leading face. The slider further comprises at least one step feature having a second surface with a first portion recessed from the air bearing surface and a second portion recessed from and conformal to the first curved surface of the leading edge blend.

6 Claims, 3 Drawing Sheets

U.S. PATENT DOCUMENTS

| | | |
|---|---|---|
| 6,608,735 B1 | 8/2003 | Serpe et al. |
| 6,643,100 B2 | 11/2003 | Iwasaki |
| 6,843,298 B1 | 1/2005 | Borg et al. |
| 6,843,705 B2 | 1/2005 | Boutaghou |
| 6,843,878 B1 | 1/2005 | Borg et al. |
| 6,916,227 B2 | 7/2005 | Mahadev et al. |
| 6,926,582 B2 | 8/2005 | Beckle et al. |
| 6,944,938 B1 | 9/2005 | Crue, Jr. et al. |
| 6,960,117 B1 | 11/2005 | Mahadev et al. |
| 6,976,302 B2 | 12/2005 | Itoh et al. |
| 6,994,608 B1 | 2/2006 | Tzeng et al. |
| 7,038,884 B1 | 5/2006 | McNeil et al. |
| 7,189,150 B2 | 3/2007 | Zhan et al. |
| 7,236,328 B2 | 6/2007 | Lu et al. |
| 7,262,938 B1 | 8/2007 | McNeil et al. |
| 7,419,421 B2 | 9/2008 | Peterson et al. |
| 7,504,038 B2 | 3/2009 | Bietsch et al. |
| 8,087,973 B1 | 1/2012 | Sladek et al. |
| 2001/0030835 A1* | 10/2001 | Hipwell et al. ............... 360/237 |
| 2002/0089787 A1 | 7/2002 | Lu et al. |
| 2003/0021059 A1 | 1/2003 | Kohira et al. |
| 2004/0242131 A1 | 12/2004 | Zhan et al. |
| 2005/0007699 A1 | 1/2005 | Ohno et al. |

FOREIGN PATENT DOCUMENTS

| | | | |
|---|---|---|---|
| JP | 06012645 A | * | 1/1994 |
| JP | 11191208 A | * | 7/1999 |
| JP | 2001043520 A | * | 2/2001 |
| JP | 2004142003 A | * | 5/2004 |

OTHER PUBLICATIONS

Office action dated Jun. 16, 2011 from parent U.S. Appl. No. 12/194,344.

Office action dated Aug. 28, 2011 from parent U.S. Appl. No. 12/194,344.

* cited by examiner

FIG. 4

START

Divide slider from bar [302]

Lap slider [304]

Form leading edge blend [306]

Clean slider [308]

Form carbon overcoat [310]

Form air bearing surface
including at least one conformal step feature [312]

END

SLIDER WITH LEADING EDGE BLEND AND CONFORMAL STEP FEATURES

CROSS-REFERENCE TO RELATED APPLICATION

This application is a divisional of U.S. patent application Ser. No. 12/194,344, filed on Aug. 19, 2008, now U.S. Pat. No. 8,087,973 B1, which is hereby incorporated by reference in its entirety.

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write.

The typical hard disk drive includes a head disk assembly (HDA) and a printed circuit board (PCB) attached to a disk drive base of the HDA. Referring now to FIG. 1, the head disk assembly 100 includes at least one disk 102 (such as a magnetic disk, magneto-optical disk, or optical disk), a spindle motor 104 for rotating the disk, and a head stack assembly (HSA) 106. The spindle motor typically includes a rotating hub on which disks are mounted and clamped, a magnet attached to the hub, and a stator. Various coils of the stator are selectively energized to form an electromagnetic field that pulls/pushes on the magnet, thereby rotating the hub. Rotation of the spindle motor hub results in rotation of the mounted disks. The printed circuit board assembly includes electronics and firmware for controlling the rotation of the spindle motor and for controlling the position of the HSA, and for providing a data transfer channel between the disk drive and its host. The head stack assembly 106 typically includes an actuator, at least one head gimbal assembly (HGA) 108 that includes a head, and a flex cable assembly 110.

During operation of the disk drive, the actuator must rotate to position the heads adjacent desired information tracks on the disk. The actuator includes a pivot bearing cartridge 112 to facilitate such rotational positioning. One or more actuator arms extend from the actuator body. An actuator coil 114 is supported by the actuator body opposite the actuator arms. The actuator coil is configured to interact with one or more fixed magnets in the HDA, typically a pair, to form a voice coil motor. The printed circuit board assembly provides and controls an electrical current that passes through the actuator coil and results in a torque being applied to the actuator. A crash stop is typically provided to limit rotation of the actuator in a given direction, and a latch is typically provided to prevent rotation of the actuator when the disk drive is not in use.

In a magnetic hard disk drive, the head typically comprises a body called a "slider" that carries a magnetic transducer on its trailing end. The magnetic transducer typically comprises a writer and a read element. The magnetic transducer's writer may be of a longitudinal or perpendicular design, and the read element of the magnetic transducer may be inductive or magnetoresistive. During operation of the magnetic hard disk drive 100, the transducer is typically supported in very close proximity to the magnetic disk 102 by a hydrodynamic air bearing. As the motor 104 rotates the magnetic disk 102, the hydrodynamic air bearing is formed between an air bearing surface of the slider of the head, and a surface of the magnetic disk 102. When the disk drive 100 is powered down, the HSA 106 rotates clockwise until a load tab of HGA 108 contacts a ramp 116 thereby lifting the slider from the surface of disk 102 before the disk 102 stops rotating. The thickness of the air bearing at the location of the transducer is commonly referred to as "flying height."

Magnetic hard disk drives are not the only type of information storage devices that have utilized air bearing sliders. For example, air bearing sliders have also been used in optical information storage devices to position a mirror and an objective lens for focusing laser light on the surface of disk media that is not necessarily magnetic.

The flying height is a key parameter that affects the performance of an information storage device. Accordingly, the nominal flying height is typically chosen as a careful compromise between each extreme in a classic engineering "trade-off." If the flying height is too high, the ability of the transducer to write and/or read information to/from the disk surface is degraded. Therefore, reductions in flying height can facilitate desirable increases in the areal density of data stored on a disk surface. However, the air bearing between the slider and the disk surface cannot be eliminated entirely because the air bearing serves to reduce friction and wear (between the slider and the disk surface) to an acceptable level. Excessive reduction in the nominal flying height degrades the tribological performance of the disk drive to the point where the disk drive's lifetime and reliability become unacceptable. Moreover, if the slider roll angle becomes excessive, then the air bearing may become even thinner at a corner of the slider than at the location of the transducer, potentially further degrading tribological performance.

Edge blending, referring to abrading an edge of the slider to produce a curved surface, was used for some time on sliders for improving flying performance where the curved edge provided better flying characteristics. However, as performance requirements for the flying height became increasingly critical, the controllability of the edge blending process was insufficiently precise, particularly as compared to other methods of shaping the air bearing surface of the slider. Furthermore, the blending removed the carbon overcoat from the slider in the area that was being abraded. These drawbacks caused edge blending to fall into disuse.

SUMMARY

A method of forming a slider includes forming a leading edge blend on a leading edge of the slider. After the leading edge blend is formed, the method further includes forming at least one step feature conformal to the leading edge blend. A slider having an air bearing surface includes a leading edge blend and at least one step feature conformal to the leading edge blend.

BRIEF DESCRIPTION OF SEVERAL VIEWS OF THE DRAWINGS

FIG. 4 illustrates a method according to an embodiment of the present invention for forming a slider with a leading edge blend.

DETAILED DESCRIPTION OF THE PREFERRED EMBODIMENTS

Figure 1:
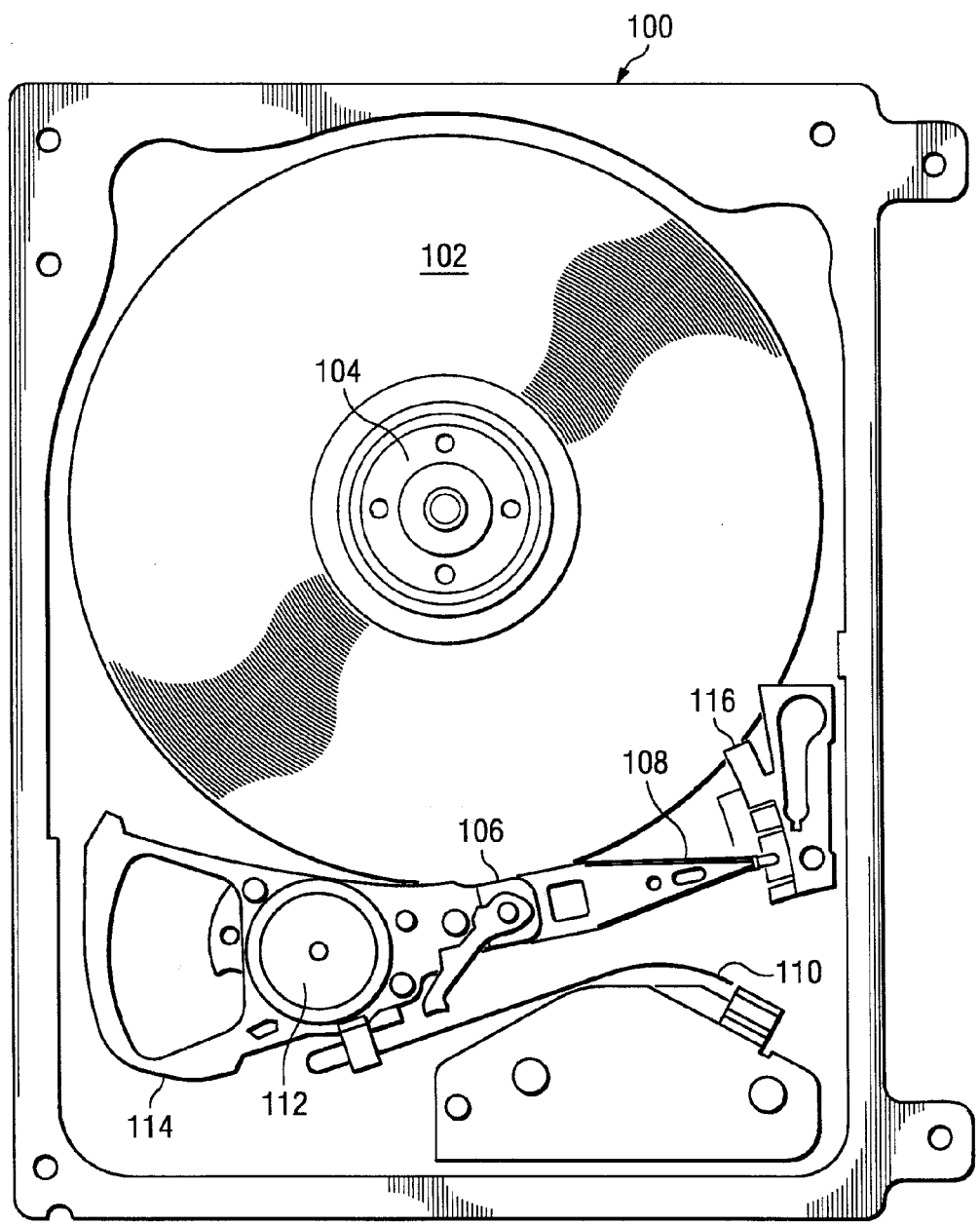
FIG. 1 illustrates a disk drive usable with a slider according to various embodiments of the particular invention.
Figure 2:
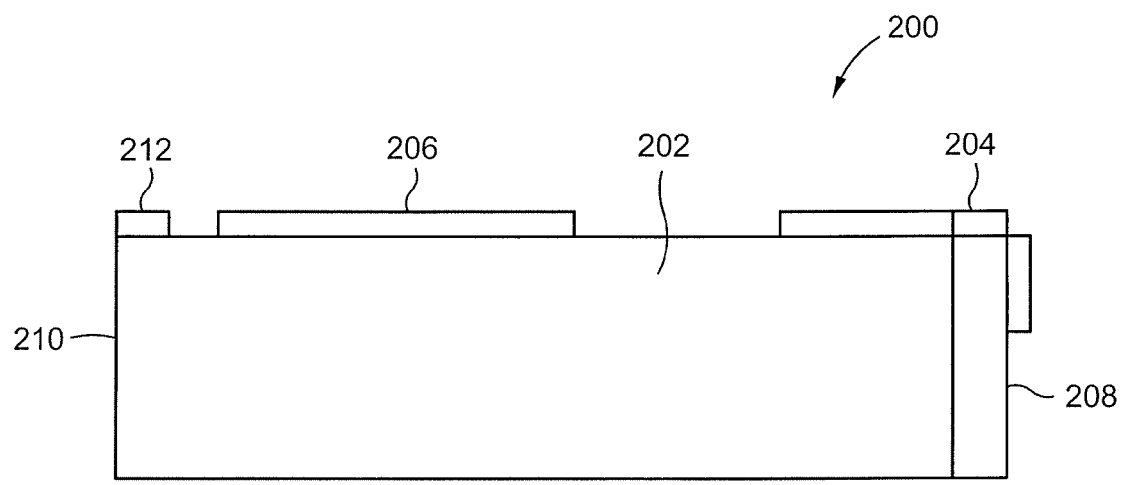
FIG. 2 illustrates a profile of a slider according to a particular embodiment of the invention.

FIG. 2 illustrates a head 200 comprising a slider 202 that includes a transducer 204 for reading information from a magnetic disk medium. In certain embodiments, the transducer 204 is a merged thin film magnetic transducer comprising an inductive writer and magnetoresistive read element. In such embodiments, the magnetoresistive element may be a giant magnetoresistive element (GMR) or a tunneling magnetoresistive element (TMR). In such embodiments, the writer may be a perpendicular magnetic recording (PMR) writer.

The slider 202, which is typically fabricated from a ceramic material such as alumina titanium carbide (AlTiC). The slider 202 includes an air bearing surface 206, which may be formed on the surface of slider 202 by etching or ion milling and has a geometry that may be defined by use of a mask. The slider 202 includes a trailing face 208 and a leading face 210, and the slider 202 may be covered by an overcoat (not shown), which is typically formed from diamond-like carbon (DLC), to protect the slider 202 and the transducer 204 from particles and objects that can damage the slider 202. The part of the air bearing surface 206 that would be closest to the disk when the slider 202 is flying over a disk defines a datum or reference plane for the air bearing surface 206, herein referred to as the "primary plane" of the slider 202. In practice, the portions of the air bearing surface 206 that would be closest to the disk (herein referred to as "highest" for ease of reference) when the slider 202 is flying over a disk may not be perfectly coplanar with one another. For example, along a length of the slider from the trailing face 208 to the leading face 210, the air bearing surface 206 may bow outward in the media-facing direction. The degree of bowing in the slider 202 is referred to as the "crown" of the slider. The crown may be expressed, for example, in terms of the difference between the highest points of the air bearing surface 206 along the length of the slider 202, and it may also be expressed as a degree of change in such height per unit length of the slider 202.

In describing the slider 202, the terms "leading" (or "forward") and "trailing" (or "aft") are directions corresponding to the respective orientation of the ends of the slider 202 as the slider 202 would fly on the air bearing over the magnetic disk medium. Thus, as the magnetic disk rotates under the slider 202, the leading end of the slider 202 would fly over a particular point on the magnetic disk before the trailing end. Similarly, the term "upstream" is used herein only to define a directional convention to facilitate description of relative positions on the air bearing surface 206, and does not require the presence or existence of any stream. For example, "upstream" can be understood to refer to a range of directions across the air bearing surface 206 that generally point away from the trailing face 208 and towards the leading face 210, with "downstream" being the antonym of "upstream" in this sense. As such, in disk drive applications, upstream directions would ultimately be generally opposite the motion of an adjacent rotating disk surface. The "sides" of the slider 202 extend between the trailing face 208 and leading face 210. Structures on the slider 202 may be described as "inner diameter (ID)-side" or "outer diameter (OD)-side" when the structure being described is nearer to the side of the slider that would be closest or farthest (respectively) from the center of the disk when the slider 202 is positioned over the disk.

Figure 3:
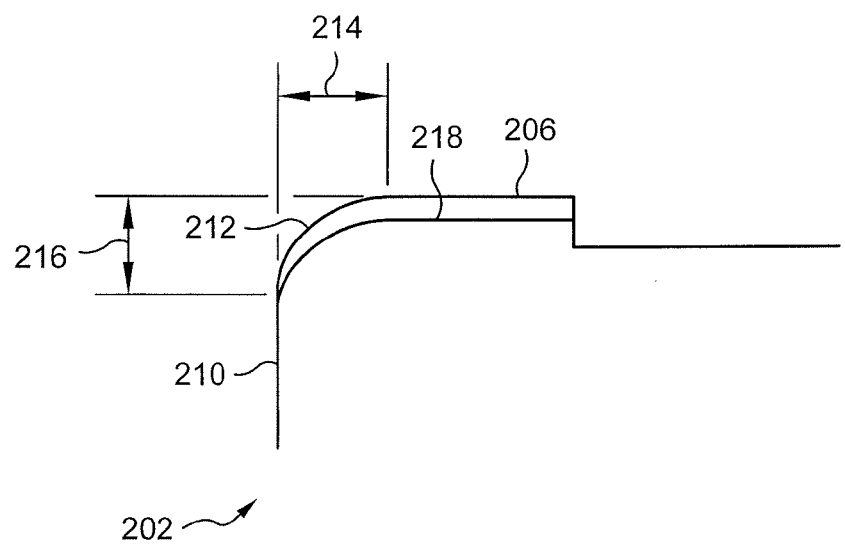
FIG. 3 illustrates a leading edge blend according to a particular embodiment of the invention.

In the illustrated embodiment, the slider 202 includes a leading edge blend 212, shown in greater detail in FIG. 3. "Leading edge blend" in this context refers to a curved surface formed at the intersection of the air bearing surface 206 and the leading face 210 by abrading or polishing the slider 202. The shape of the leading edge blend 212 can be generally characterized in terms of a blend penetration 214 and a blend depth 216. The blend penetration 214 indicates the distance between the plane of the leading face 210 to the point at which the air bearing surface 206 straightens, while the blend depth 216 indicates the distance from the primary plane of the air bearing surface 206 to the point at which the leading face 210 straightens. In particular embodiments, the blend depth may be around 0.4 microns with a blend penetration of around 2.5 microns. The slider 202 also includes a conformal step feature 218. The conformal step feature 218 is recessed from the primary plane of the air bearing surface 206, and it is conformal to the curvature of the leading edge blend 212. Such a conformal step feature 218 may be formed, for example, by blending the leading edge first and then etching or ion milling to recess a particular portion of the curved surface. Conformal step features 218 may include, for example, leading edge steps. In FIG. 3, the conformal step feature 218 is a recessed step surface on the OD side of a higher surface chosen for ease of illustration, but it should be understood than any manner of step surfaces, channels, dams, or the like with any combination of depths could also be used.

As contrasted with previous edge blending methods, the conformal step features 218 of various embodiments of the present invention are advantageous in that the shape of the conformal step features 218 can be controlled with relatively precise etching or milling techniques. Thus, the controllability of the edge blending process need not limit the precision in forming particular features of the air bearing surface 206. This allows the flight of the slider 202 on the air bearing to be well-controlled, but it also allows advantages of a blended leading edge surface to be incorporated in the slider 202 as well. For example, the slider 202 may be able to regain its air bearing more easily when subject to a mechanical disturbance, such as operational shock, that disrupts the flight of the slider 202. Likewise, if the slider 202 collides with an object, the leading edge blend 212 may help to reduce the damage to the disk. Additionally, the trailing face 208 and the sides of the slider 202 may also include a blend, which may reduce particle shedding from the slider.

FIG. 4 is a flow chart 300 illustrating an example method of forming a slider according to a particular embodiment of the present invention. The slider 202 is divided from a slider bar at step 302. The slider 202 is lapped to define various surfaces at step 304. The lapping step 304 may involve several difference lapping steps and process, such as lapping different sides, "rough" lapping to generally define a surface, precision lapping using an electronic lapping guide, and one or more annealing steps to heat the material of the slider 202 in order to produce desired properties.

After the slider is lapped, then the edge of the slider 202 is blended at step 306. Blending the edge of the slider 202 involves abrading material from the slider 202 to produce the curved edge. For example, the slider 202 can be pressed against an abrasive surface that moves back and forth against the slider 202. In some embodiments, the abrasive surface can be vibrated at a selected frequency to abrade the slider 202. The abrasive surface can be placed at an angle to the leading face 210 and the primary plane of the slider 202. In particular embodiments, the angle between a plane of the abrasive surface and the primary plane of the slider 202 is between 10 and 20 degrees. The abrasive surface can also be placed over a compliant material, such as a rubber pad, so that the abrasive surface wraps around the slider 202, which can produce a more uniform blended edge. In particular embodiments, the compliant material may be a rubber pad with a Shore durometer hardness of at least 40 Shore D. Both the leading and trailing edges of the slider 202 may be blended.

After the edge blending step 306, the slider may be cleaned at step 308 to remove stray particles. The carbon overcoat is formed at step 310. Following the carbon overcoat deposition, an air bearing surface 206 including at least step feature conformal to the leading edge blend is formed at step 312. The conformal step feature 218 may be formed using any combination of masking, etching, milling, or other processes for recessing surfaces in the air bearing surface of the slider 202. The conformal step feature 218 may include any kind of step, channel, dam, or the like used in air bearing surfaces of sliders. The formation of the conformal step feature 218 is the last step of the method 300 of FIG. 4, but it should be understood that the described method may be integrated with any number of compatible slider formation processes, and that the described steps do not all necessarily need to be performed or performed in the described order in order to practice methods according to the present invention.

More generally, in the foregoing specification, the invention is described with reference to specific exemplary embodiments thereof, but those skilled in the art will recognize that the invention is not limited thereto. It is contemplated that various features and aspects of the above-described invention may be used individually or jointly and possibly in an environment or application beyond those described herein. The specification and drawings are, accordingly, to be regarded as illustrative and exemplary rather than restrictive. The terms "comprising," "including," and "having," as used herein are intended to be read as open-ended terms.

What is claimed is:

1. A slider having an air bearing surface and a leading face, comprising:
   a leading edge blend comprising a first curved surface formed at an intersection of the air bearing surface and the leading face; and
   at least one step feature having a second surface with a first portion recessed from the air bearing surface and a second portion recessed from and conformal to the first curved surface of the leading edge blend.

2. The slider of claim 1, further comprising a carbon overcoat over the leading edge blend.

3. The slider of claim 1, further comprising a trailing edge blend.

4. The slider of claim 1, further comprising a blend on at least one side of the slider.

5. The slider of claim 1, wherein the leading edge blend has a blend penetration distance between a plane of the leading face and a point at which the air bearing surface straightens of around 2.5 microns.

6. The slider of claim 1, wherein the leading edge blend has a blend depth distance between a primary plane of the air bearing surface and a point at which the leading face straightens of around 0.4 microns.

* * * * *